United States Patent [19]

Takegoshi et al.

[11] 4,257,144
[45] Mar. 24, 1981

[54] MEAT TAPPER

[75] Inventors: Katsuki Takegoshi, Kyoto; Kiyomi Ono, Osaka, both of Japan

[73] Assignees: Takegoshi Industry; Ohyodo Kinzoku Kogyo, both of Japan

[21] Appl. No.: 924,178

[22] Filed: Jul. 13, 1978

[51] Int. Cl.³ .............................................. A22C 9/00
[52] U.S. Cl. ...................................................... 17/30
[58] Field of Search ................................ 17/25, 30, 31

[56] References Cited

U.S. PATENT DOCUMENTS

| 1,220,970 | 3/1917 | Frohmann | 17/25 |
| 1,996,949 | 4/1935 | Bosworth et al. | 17/31 X |

FOREIGN PATENT DOCUMENTS

| 1288942 | 2/1969 | Fed. Rep. of Germany | 17/30 |
| 2645337 | 4/1977 | Fed. Rep. of Germany | 17/25 |
| 2337503 | 8/1977 | France | 17/30 |
| 93323 | 11/1938 | Sweden | 17/30 |
| 201606 | 5/1939 | Switzerland | 17/30 |

Primary Examiner—Willie G. Abercrombie
Attorney, Agent, or Firm—Eyre, Mann, Lucas & Just

[57] ABSTRACT

The meat tapper for making a meat tender and palatable, has a head, a blade carrier detachably secured to the head, and a blade guide, wherein the head is provided with a force absorbing means whereby a force applied to the head by hand is prevented from transmitting to the blade guide, thereby enabling the blades carried on the carrier to thrust into the meat while the blade guide stays on the meat, during which the muscular tissues in the meat are cut.

7 Claims, 12 Drawing Figures

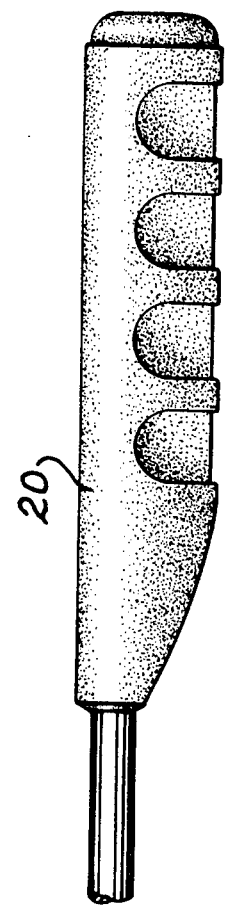
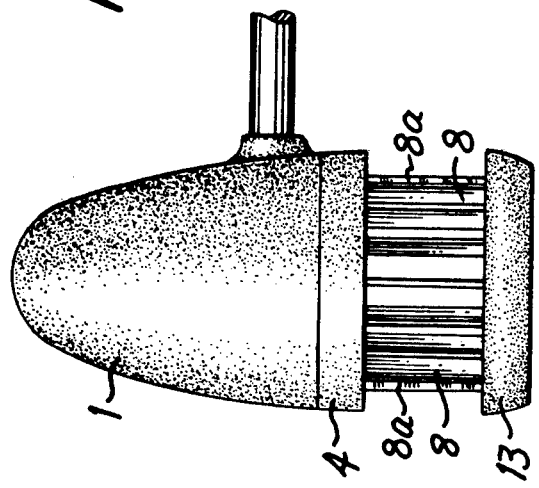
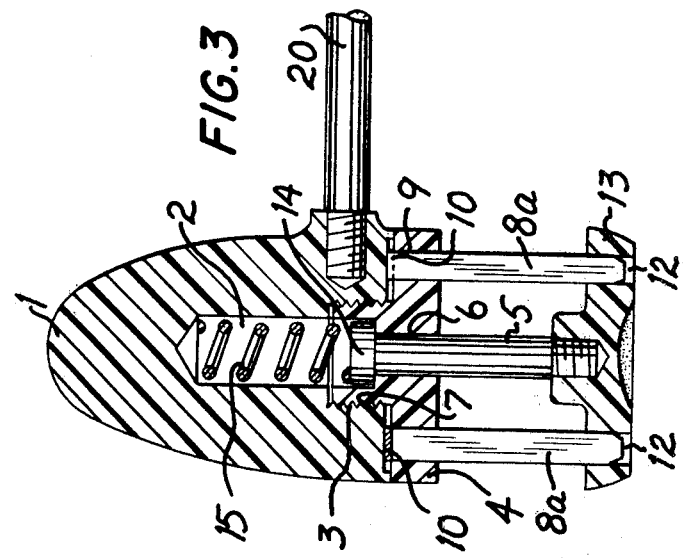

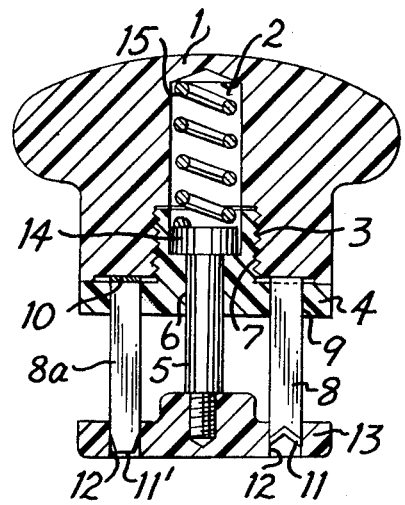
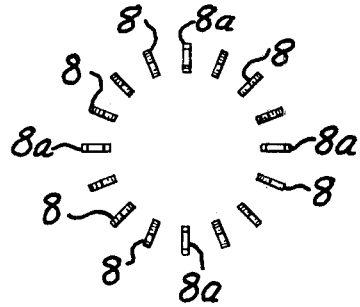
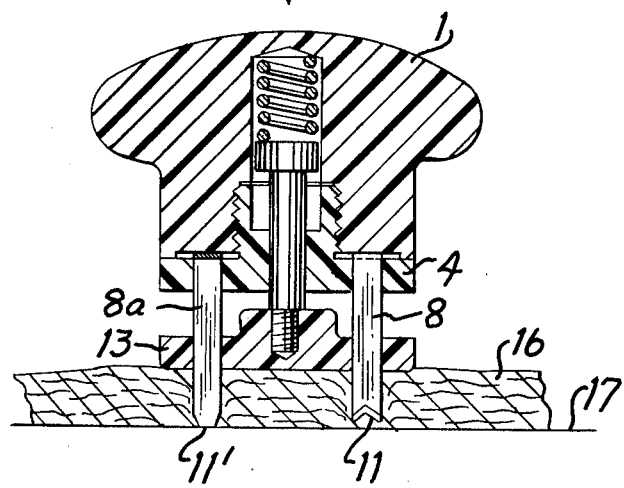
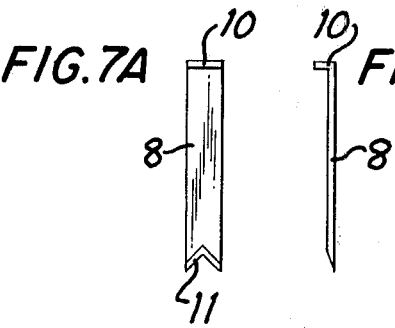
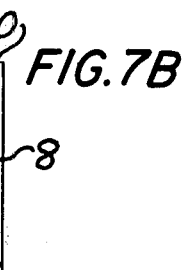
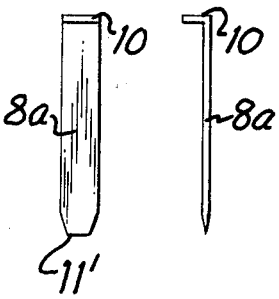
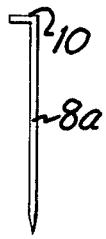

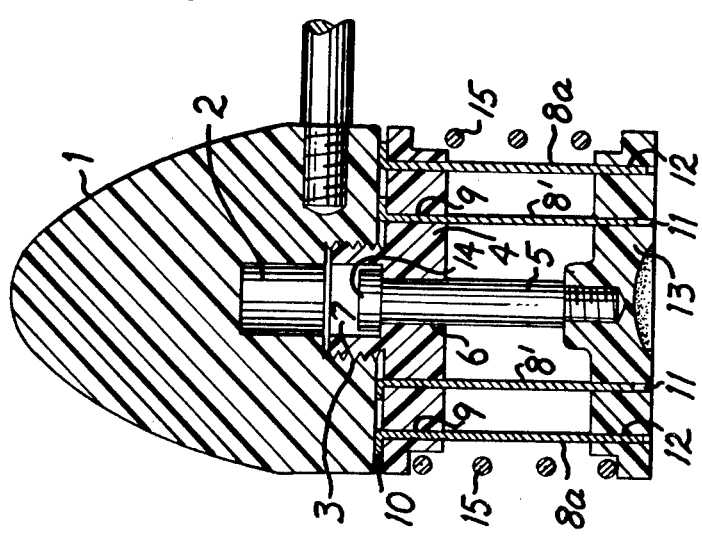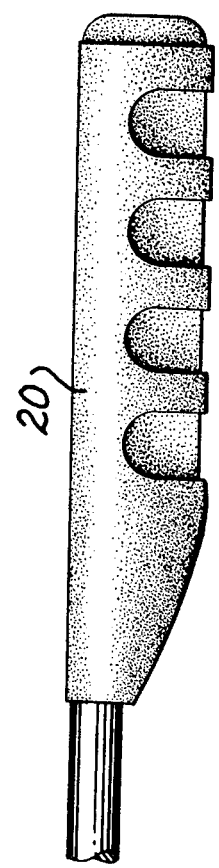

MEAT TAPPER

The present invention relates to a meat tapper for making a meat tender and palatable. More particularly, the invention relates to an improved meat tapper of a handy type, capable of cutting the muscular tissues in the meat, thereby making the meat tender and palatable without spoiling its taste and flavor.

To make a meat tender, the conventional method is to strike light blows on it by a hammer-like tapping tool, prior to grilling or frying. However, the conventional tappers are tapping tools in the true sense of the word, and are not intended to cut the muscular tissues in the meat. Therefore, it is additionally required to cut them by a knife or any other special kind of blade. This is not only a difficult work for ordinary housewives, but also, it is likely to spoil the original taste and flavor of the meat by losing the flesh juice during the cutting operation. In addition, in cutting the muscular tissues the shape of a steak to be grilled is spoiled, which will be of particular disadvantage for restaurant owners.

The present invention aims at solving the problems encountered by the known meat tapping and tissue cutting methods, and has for its object to provide an improved meat tapper capable of dual functions of tapping as well as tissue cutting, thereby making the meat tender and palatable without losing the original taste and flavor.

According to one aspect of the present invention, the meat tapper has a head, a blade carrier detachably secured to the head, wherein the blade carrier carries blades with their edges downwardly directed, and a blade guide supported on the blade carrier, wherein the head has a force absorbing means for preventing a force applied by hand to the head from transmitting to the blade guide, in addition to which a spring means is provided between the head and the blade guide so as to enable the head to restore its original postion when the head is freed of hand.

According to another aspect of the present invention, the meat tapper is provided with a handle secured at right angle to the head portion, thereby facilitating to tap a meat by hand.

The present invention will be more particularly described by way of example with reference to the drawing, in which:

FIG. 1 is a front view of a meat tapper according to the present invention;

FIG. 2 is a bottom view of the meat tapper in FIG. 1, wherein the handle is omitted;

FIG. 3 is a vertical cross-section through the head, the blade carrier and the blade guide;

FIG. 4 is a vertical cross-section through a modified version of the embodiment according to the present invention;

FIG. 5 is a vertical cross-section through the meat tapper in FIG. 4, particularly to show its application to a meat;

FIG. 6 is a diagrammatic view showing an arrangement of blades;

FIG. 7 (a) and (b) are perspective views of a blade in one preferred form;

FIG. 8 (a) and (b) are perspective views of a blade in a modified preferred form;

FIG. 9 is a vertical cross-section through a further modified version of the embodiment according to the present invention;

FIG. 10 is a vertical cross-section through the meat tapper in FIG. 9, particularly to show its application to a meat;

FIGS. 11 and 12 are diagrammatic views showing two different arrangements of blades.

Referring to FIGS. 1 to 3, the meat tapper illustrated therein has a head 1 provided with a handle 20, a blade carrier 4 and a blade guide 13 including slits 12 for enabling the blades to pass through. The head 1 includes a bore 2 in which a coil spring 15 is housed so as to impart a downward urge to the blade guide through a T-shaped rod 5 secured thereto. The T-shaped rod has a head 14 intended to prevent the same from passing through a bore 6 produced in the blade carrier 4. The head 1 includes internal threads 3 whereas the blade carrier includes external threads 7, thereby assuring the unification of the head and the blade carrier. The handle 20 is screwed in the head 1.

The blade 8 has a flange 10 for preventing the same from passing through a slit 9 produced in the blade carrier, and can be carried on the blade carrier by having its flange 10 held in between the engaging faces of the head 1 and the blade carrier when they are fastened as mentioned above. In the drawings two different kinds of blades 8 and 8a are shown, wherein the distinction is made by their edge shapes. The blade 8a has a straight edge 11' whereas the blade 8 has an inverted V-shaped edge 11, as illustrated in FIGS. 7 and 8, such that the blade 8a is longer than the blade 8. It is preferred that the longer blades 8a are placed at every one-fourth position as shown in FIG. 6, or alternatively, the longer blades 8a can be placed at random among the shorter blades 8. This is advantageous when the blades are placed into contact with the meat on the table or any other solid material, because the longer blade 8a reaches the table earlier than the shorter blade 8, thereby protecting the inverted V-shaped edges 11 from a possible breakage due to the collision against the solid table as illustrated in FIG. 5. The blade guide 13 is provided with the slits 12 for enabling the blades to pass through. Normally when the meat tapper is not in use, the edges of the blades 8 and 8a are in withdrawn position from the openings of the slits 12, thereby securing safety from the edges of the blades.

FIGS. 4 and 5 illustrate a modified version of the embodiment, wherein the head 1 is formed like a knob instead of providing the handle 20. In this embodiment the meat tapper is applied to the meat 16 by pushing the head 1 by hand in the direction indicated by the arrow. The head 1 can be provided with a strap (not shown) for holding the hand therein.

The meat tapper illustrated in FIGS. 9 and 10 has the coil spring 15 around the blade carrier 4, not in the bore 2 of the head 1. In addition, the blade carrier 4 is provided with the blades 8 and 8a co-axially in two rows as shown in FIG. 11, wherein each blade is placed substantially in parallel with the periphery 18 (FIG. 11) of the blade guide 13. FIG. 12 illustrates a modified arrangement of blades, wherein the blades 8' in the inner row are placed radially with respect to the blades in the outer row. The spring 15 is mounted between the blade carrier and the blade guide, and the bore 2 is hollow enough to receive the T-shaped rod 5 reciprocally moving.

In use, the meat tapper is applied upon the meat 16 on the table 17 with its handle 20 held by a hand, or with its head pushed by a hand from above. Under the pressure given by the hand the coil spring 15 is compressed, thereby pressing the T-shaped rod 5 downwardly. In this way the blades are thrust through the slits 12 of the blade guide 13, thereby enabling the edges 8, 8a and 8' to poke in the meat. During the poking the muscular tissues are cut.

In the illustrated embodiments the T-shaped rod is screwed in the blade guide, but they can be made in one body by plastic molding, wherein the head 14 of the T-shaped rod can be replaced by a nylon washer adapted for heat adhesion. Other modifications to the embodiment can be variously made without departing from the spirit of the invention.

What we claim is:

1. A meat tapper comprising:
   (a) a head;
   (b) a blade carrier detachably secured to said head;
   (c) said blade carrier carrying a plurality of blades with their edges downwardly directed;
   (d) a blade guide having slits for passing said blades through;
   (e) guiding means for enabling translation of said blade guide with respect to said blade carrier, thereby enabling the blade guide to be stationary on the meat;
   (f) a spring means provided between said head and said blade guide so as to enable said blade guide to return to its original position when the same is freed from the meat; and
   (g) said plurality of blades comprising ones having an inverted V-shaped edge and ones having a straight edge wherein the former are shorter than the latter in length.

2. A meat tapper as claimed in claim 1, wherein the head includes a handle.

3. A meat tapper as claimed in claim 1, wherein the guiding means comprises a bore produced in said head, thereby permitting said blade guide to play therein when the head is pushed downwards by hand, and wherein the spring means is a coil spring housed in said bore.

4. A meat tapper as claimed in claim 1, wherein the guiding means comprises a bore produced in said head, thereby permitting said blade guide to play therein when said head is pushed downwards by hand and wherein the spring means is a coil spring wound around said blade carrier.

5. A meat tapper as claimed in claim 9, wherein the blades are radially carried in the blade carrier.

6. A meat tapper as claimed in claim 9, wherein the blades are carried in two rows with their width being co-axial with said blade carrier.

7. A meat tapper as claimed in claim 9, wherein the blades are carried in said blade carrier in two rows wherein the blades in the outer row have their width co-axial with said blade carrier whereas the blades in the inner row have their width radial with the same.

* * * * *

UNITED STATES PATENT AND TRADEMARK OFFICE
CERTIFICATE OF CORRECTION

PATENT NO. : 4,257,144
DATED : March 24, 1981
INVENTOR(S) : Katsuki Takegoshi et al.

It is certified that error appears in the above-identified patent and that said Letters Patent are hereby corrected as shown below:

Amend the first page of patent document by adding the following thereto between items [22] and [51]:

[30] Foreign Application Priority Data

July 20, 1977 [JP] Japan .......... 97482/77
July 20, 1977 [JP] Japan .......... 97483/77

Signed and Sealed this

Twenty-first Day of July 1981

[SEAL]

Attest:

GERALD J. MOSSINGHOFF

Attesting Officer   Commissioner of Patents and Trademarks